(12) United States Patent
Venkatesan et al.

(10) Patent No.: US 7,382,905 B2
(45) Date of Patent: Jun. 3, 2008

(54) DESYNCHRONIZED FINGERPRINTING METHOD AND SYSTEM FOR DIGITAL MULTIMEDIA DATA

(75) Inventors: Ramarathnam Venkatesan, Redmond, WA (US); Mehmet Kivanc Mihcak, Redmond, WA (US); Mehmet Kucukgoz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/777,915

(22) Filed: Feb. 11, 2004

(65) Prior Publication Data

US 2005/0175224 A1    Aug. 11, 2005

(51) Int. Cl.
*G06K 9/00* (2006.01)
(52) U.S. Cl. ............... 382/124; 382/232; 713/176; 380/201; 705/51
(58) Field of Classification Search ............... 382/100, 382/124, 232, 276, 115; 713/176, 181, 193, 713/170; 380/201, 202, 55; 348/E5.006, 348/E5.008, E7.06, E7.07; 705/57, 53, 51, 705/80, 58
See application file for complete search history.

(56) References Cited

U.S. PATENT DOCUMENTS

| | | | |
|---|---|---|---|
| 6,546,114 B1 | 4/2003 | Venkatesan et al. | |
| 6,574,348 B1 | 6/2003 | Venkatesan et al. | |
| 7,043,638 B2 * | 5/2006 | McGrath et al. | ............ 713/176 |
| 2001/0025342 A1 * | 9/2001 | Uchida | ........................ 713/186 |
| 2002/0010679 A1 * | 1/2002 | Felsher | ........................ 705/51 |
| 2007/0053513 A1 * | 3/2007 | Hoffberg | ................... 380/201 |

OTHER PUBLICATIONS

Adelsbach, A., Katzenbeisser, S. and Sadeghi, A., "Cryptography Meets Watermarking: Detecting Watermarks with Minimal or Zero Knowledge Disclosure" (invited paper), in *European Signal Processing Conference* 2002, Toulouse, France, 2002.

Battle, E., Masip, J. and Cano, P., "System analysis and performance tuning for broadcast audio fingerprinting", *Proceedings of 6th International Conference on Digital Audio Effects*, London, UK, 2003.

(Continued)

*Primary Examiner*—Sheela Chawan
(74) *Attorney, Agent, or Firm*—Lyon & Harr, L.L.P.; Craig S. Fischer

(57) ABSTRACT

A desynchronized fingerprinting method and system for identifying collaborators in the making of illegal copies of digital multimedia products. The desynchronized fingerprinting system and method can be used for both audio and video applications. The method and system include an embedding feature and a detection and extraction feature. A different and unique key is assigned to each buyer of a copy of the digital data. The embedding feature includes applying a pseudo-random transformation to selected embedding regions. The key for the pseudo-random transform is user-specific. These regions are chosen by using a secure multimedia hash function. The detection and extraction feature includes a brute-force search in the key space of the buyers. If one of the keys is likely enough, then it can be said that that user was been involved in the production of an illegal copy.

24 Claims, 9 Drawing Sheets

OTHER PUBLICATIONS

Boneh, D. and Shaw, J., "Collusion-secure fingerprinting for digital data" in *Advances in Cryptology—CRYPTO '95*, vol. 963 of LNCS, pp. 452-465, 1995.

Charbon, E. and Torunoglu, I., "Digital Fingerprinting of Virtual Components", in *Proc. International Workshop On IP Based Synthesis and System Design*, pp. 221-224, Grenoble, Dec. 1999.

Domingo-Ferrer, J. and Herrera-Joancomarti, J., :Simple Collusion-Secure Fingerprinting Schemes for Images *ITCC 2000*: 128-132.

Fernández, M., and Soriano, M., "Efficient Identification of Traitors in Fingerprinted Multimedia Contents", *DEXA Workshops 2002*: 463-467.

Fernandez, M. and Soriano M., "Intellectual property protection of e-learning contents" *International Conference on Network Universities and E-learning*, Valencia, (Spain) 2003.

Kirovski, D., Malvar, H.S. and Yacobl, Y., "*A Dual Watermarking and Fingerprinting System.*", IEEE International Symposium on Information Theory, 2002.

Kirovski D. and Malvar H., "Embedding and Detecting Spread Spectrum Watermarks under The Estimation Attack", *International Conference on Acoustics, Speech, and Signal Processing*, Orlando, FL, IEEE (2002).

Lu, C-S and Hsu, C-Y, "Resistance of Anti-Disclosure Image Watermark to Collusion and Copy Attacks: An Approach of Combining Perceptual Hash and Watermark", *Technical Report TR-IIS-03-012*, Institute of Information, Academia Sinica, Taiwan, R.O.C., 2003.

Qu, G. and Potkonjak, M., "Fingerprinting intellectual property using constraint-addition", *Design Automation Conference*, pp. 587-592. 2000.

Su, J.K., Eggers, J.J. and Girod, B., "Capacity of Digital Watermarks Subjected to an Optimal Collusion Attack," *European Signal Processing Conference (EUSIPCO2000)*, Tampere, Finland, Sep. 2000.

\* cited by examiner

DESYNCHRONIZED FINGERPRINTING METHOD AND SYSTEM FOR DIGITAL MULTIMEDIA DATA

TECHNICAL FIELD

The present invention relates in general to multimedia fingerprinting and more particularly to a secure fingerprinting system and method for identifying collaborators in the making of illegal copies of digital multimedia products.

BACKGROUND OF THE INVENTION

The illegal copying of digital multimedia data products (such as movies and audio recordings) is a widespread problem. The problem only seems to be growing, despite technical advancements in copy protection and mounting efforts to enforce intellectual property rights. This infringement of intellectual property rights can cause great financial harm to the owner.

The upward trend in illegal copying seems to be tied to the expanding use of digital media and equipment for storing and distributing digital multimedia data. The enormous growth of Internet technology and digitally stored data has made it possible to easily and inexpensively produce high-quality identical copies of an original. In addition, it is possible to make the copies available to the entire Internet community. This process has become further easier with the usage of peer-to-peer (P2P) networks. With the increasing availability of copying devices and increased bandwidth for digital data, the need to restrain illegal redistribution of digital multimedia data (such as images,. videos and music) has become an important issue.

One way to deter illegal copying is to increase the risk of being caught after the piracy has occurred. Storing a unique, invisible mark in each copy (in other words, embedding the mark in the perceptual content of the digital media signal securely and robustly) is a way to increase that risk. In this manner, if an illegal copy is found somewhere, it is possible to find the owner of the copy and to take legal action. This type of enforcement scheme is called fingerprinting (also known as "mark embedding" for forensics in some communities).

The idea of fingerprinting is to uniquely mark each copy. This makes each copy bit-wise different from every other copy, and yet otherwise perceptually approximately the same. In this way, it is possible to distinguish between all legal copies. The marking can be used to identify the copy, and thereby the user if his identity is linked to the fingerprint in some way. For example, if the fingerprinted copies are only distributed to those persons who identify themselves, it may be possible, if an illegal copy is found, to identify the owner of the legal copy from which the illegal copy was made.

By way of example, assume the owner of a movie on digital video disk (DVD) makes copies of the movie for sale. Each of the copies is fingerprinted. The owner only sells a copy to a user after having individually and uniquely marked each user's copy with a fingerprint and associated each fingerprint uniquely with a buyer. Later, a number of buyers, called pirates, collude in creating an illegal copy that they redistribute (in this situation the pirates are also called colluders). The owner of the movie can analyze an illegal copy and attempt to find out which of the buyers took part in the creation of the illegal copy.

The fingerprinting technique includes inserting fingerprints in each copy of a digital product using a watermarking (also termed "mark embedding") scheme. A watermarking scheme imperceptibly embeds the fingerprint in the perceptual content in a way that it can only be recovered using a secure key. It should be noted that this type of scheme is completely different from conventional Digital Rights Management (DRM) techniques for content protection. There are two important differences between watermarks (for screening purposes to prevent illegal copying or recording) and fingerprints (for forensics purposes to trace the leakage). First, while in watermarking the hidden message (mark) is the same for all buyers (and this mark often represents the identity of the content owner), in fingerprinting the mark depends on the buyer's identity. Second, buyer collusion is not an issue in watermarking (the marked copies for a single content being the same for all buyers). However, in fingerprinting the mark is different for every buyer, and it makes sense for a collusion of buyers to collude by comparing their copies and try to locate and delete some mark bits. Thus, in a collusion attack on fingerprinted digital products, a group of dishonest users colludes to create an illegal copy that hides their identities by putting together different parts of their copies. The attack seeks to eliminate the hidden embedded fingerprints.

One problem with current fingerprinting techniques is that they are limited in the number of collaborators that can be identified. For example, several traditional current fingerprinting techniques can only identify between four and eight collaborators. Some newer fingerprinting techniques use fingerprinting codes to enable the detection of an order of magnitude better that traditional fingerprinting techniques. However, there are frequently a large number of collaborators involved in the production of an illegal copy. This means that current fingerprinting techniques cannot accurately detect and identify collaborators greater than one-hundred. This severely limits the deterrent effect of fingerprinting, since collaborators know that all they have to do is collaborate with a large number of other copy owners to avoid detection.

Another problem with current fingerprinting techniques is that they are susceptible to estimation attacks. Estimation attacks occur when attackers take all of the frames of the scene and compute an average of all the frames, thereby forming an estimate of the original unmarked content. Alternatively, different techniques may also be used to estimate the fingerprint of each client using the inherent redundancy that is present in the media signal. This tends to greatly weaken or eliminate all of the fingerprints. Therefore, what is needed is a fingerprinting system and method that is capable of accurately identifying at least an order of magnitude greater number of collaborators than current fingerprinting techniques. What is also needed is a fingerprinting system and method that is (cryptographically) secure and resistant to estimation attacks.

SUMMARY OF THE INVENTION

The invention disclosed herein includes a desynchronized fingerprinting method and system that is resistant to attacks and that can identify a large number of collaborators without the use of fingerprinting codes. In particular, the desynchronized fingerprinting method and system disclosed herein is capable of identifying more than an order of magnitude more collaborators than current fingerprinting techniques.

The desynchronized fingerprinting system and method can be used for any type of multimedia, particularly audio and video applications. In general, a different key is assigned to each user. The embedding feature includes applying a pseudo-random transformation to chosen regions. The key for the pseudo-random transform is user-specific. These regions are chosen via a secure multimedia hash function. The detection and extraction feature includes a brute-force search in the key space of the users. If one of the keys is "likely" enough, it is declared that the user has been involved in the production of an illegal copy.

The desynchronized fingerprinting method includes a desynchronized embedding process and a detection and extraction process. The desynchronized embedding process includes generating copies of an original multimedia product (where each copy is a pseudo-random desynchronized version of the original) and randomly selecting both desynchronization and embedding regions in which to embed fingerprints. The pseudo-random "intentional" desynchronization prior to actual mark embedding ensures that it is difficult for colluders to find a good estimate of the unmarked original signal (such as, for example, by using averaging-type attacks). This is because it is necessary for the colluders to "align" their copies with respect to each other for collusion, and this becomes more difficult as the number of colluders increases (assuming the total computation power is limited). A random desynchronization process includes mapping the width of each desynchronization region to a pseudo-randomly determined quantity such that they vary between copies for different clients. A master key is used in the random desynchronization process. Similarly, a master key and a hash function are used to randomly select the embedding regions. Unique copy information and secret keys then are embedded in the embedding regions. In general, embedding regions and desynchronization regions need not be the same, though they can overlap.

The detection and extraction process includes obtaining an illegal copy of the original digital multimedia product. Hash values are computed for the illegal copy, and these hash values are used to determine the embedding regions by comparing them to the hash values of the embedding regions of the original content. In essence, robust perceptual hash functions are used to "lock" to the embedding locations at the receiver. Watermark detection then is performed on each of the embedding regions using each one of the secret keys. Identification information is detected and collaborator information is extracted to construct a list of collaborators. These collaborators represent persons who collaborated on the production of the illegal copy.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

The illegal copying and distribution of digital multimedia data has become a widespread problem, resulting in the loss of revenue for the owner of the intellectual property. One way to increase the risk of being caught is to use fingerprinting techniques that uniquely identify a copy of a product containing the digital multimedia data with a buyer. However, current fingerprinting techniques are severely limited on the number of collaborators that can be identified. In addition, these techniques typically use fingerprinting codes, which can be difficult to implement. Moreover, current fingerprinting techniques are vulnerable to estimation attacks, which can virtually eliminate the fingerprints.

The desynchronized fingerprinting method and system described herein is capable of identifying at least an order of magnitude greater number of collaborators than current techniques. Moreover, the method and system achieves this without the use of fingerprinting codes. Although codes may be used with the desynchronized fingerprinting method and system, they are not required. In addition, the desynchronized fingerprinting method and system is made resistant to estimation attacks through the use of a novel random desynchronization process that randomly varies the width of randomly-selected desynchronization regions. Then, fingerprints are embedded for each copy of the digital multimedia data in embedding regions, which may be the same as or different from desynchronization regions. By increasing the number of collaborators that can be identified and by making the technique resistant to estimation attacks, the desynchronized fingerprinting method and system serves as a strong deterrent to illegal copying.

II. General Overview

Figure 1:
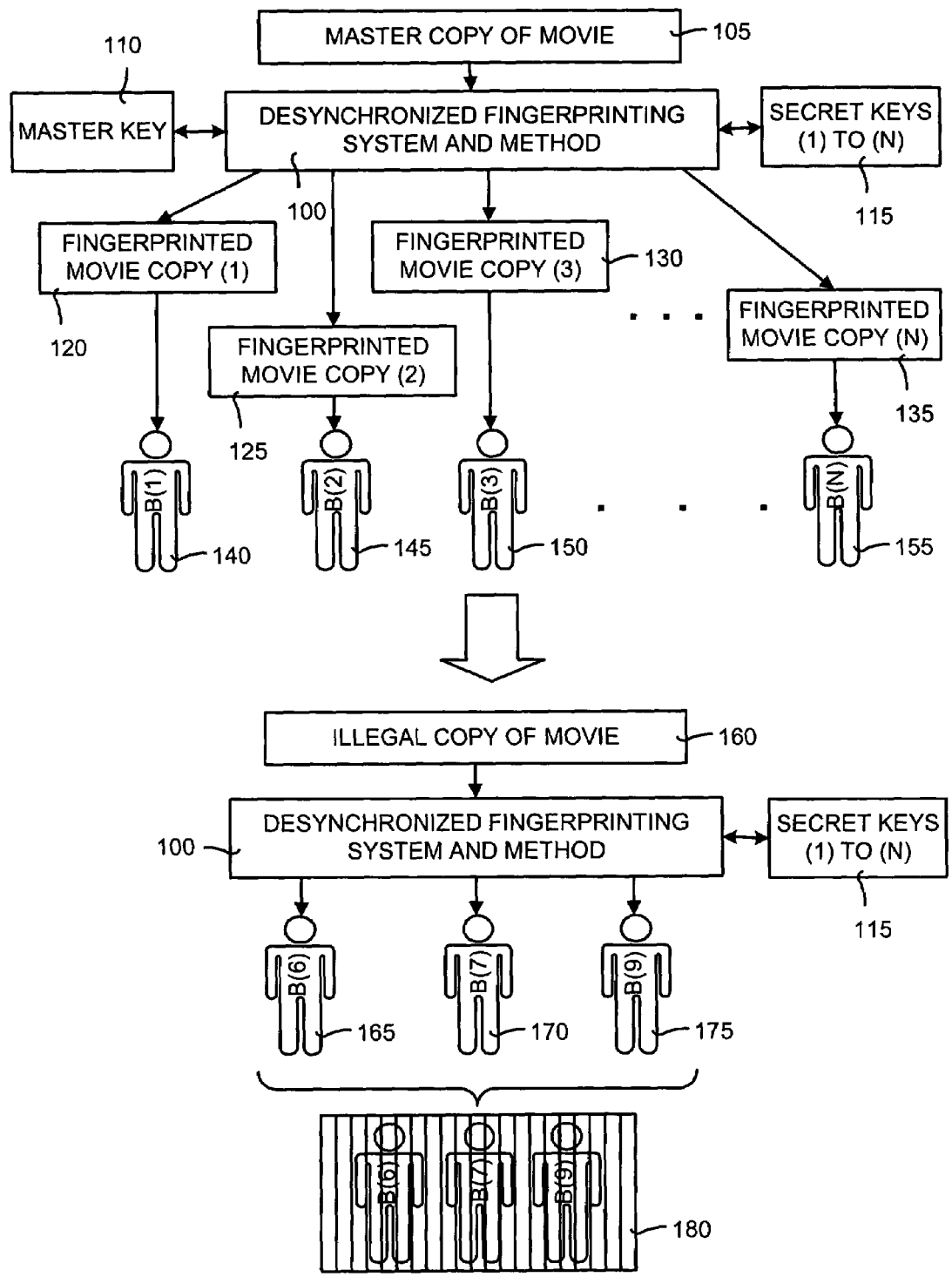
FIG. 1 is a block diagram illustrating an exemplary implementation of the desynchronized fingerprinting system and method disclosed herein.

FIG. 1 is a block diagram illustrating an exemplary implementation of the desynchronized fingerprinting system and method disclosed herein. It should be noted that FIG. 1 is merely one of several ways in which the desynchronized fingerprinting system and method may implemented and used.

The desynchronized fingerprinting system and method operates on digital multimedia data (such as images, video, or audio). In general, there are two parts to the desynchronized fingerprinting system and method. The first part is using the desynchronized fingerprinting system and method to embed unique information within each copy of a digital multimedia product (such as a movie or an audio recording). This unique information is cataloged so that a copy of the product is associated with a specific person (such as the buyer of the product copy). The second part involves analyzing an illegal copy of the product (such as, for example, forensics analysis) to determine which of persons collaborated to produce the illegal copy.

In the exemplary implementation shown in FIG. 1, the digital multimedia product is movie. More specifically, as shown in FIG. 1, the desynchronized fingerprinting system and method 100 is used to process a master copy of a movie 105. As described in detail below, the desynchronized fingerprinting system and method 100 uses a master key 110 and a plurality of secret keys 115. In this exemplary implementation the number of secret keys is N. After processing, the output of the desynchronized fingerprinting system and method 100 is N copies of the movie 105. In particular, the desynchronized fingerprinting system and method 100 produces a fingerprinted movie copy (1) 120, a fingerprinted movie copy (2) 125, a fingerprinted movie copy (3) 130, and so forth, up to a fingerprinted movie copy (N) 135. Each of the fingerprinted movie copies has a corresponding one of the secret keys 115. The secret key associated with the fingerprinted movie copy allows the holder of the key to access the unique information contained within the movie copy.

Each of the fingerprinted movie copies then is distributed in some manner. Typically, distribution includes offering for sale. However, other types of distribution are possible, such as distribution for some other purpose to clients, such as reviewing, evaluation, and so forth. In the exemplary implementation shown in FIG. 1, the distribution is by someone purchasing a fingerprinted copy of the movie. In particular a first buyer (B(1)) 140 buys fingerprinted movie copy (1) 120, a second buyer (B(2)) 145 buys fingerprinted movie copy (2) 125, a third buyer (B(3)) 150 buys fingerprinted movie copy (3) 130, and so forth such that an $N^{th}$ buyer (B(N)) 155 buys fingerprinted movie copy (N) 135. A record is kept of each of the buyers and the copy number of the movie they bought.

An illegal copy of the movie 160 is typically made by a collaboration of several of the buyers, as shown by the arrow 165 in FIG. 1. However, the identity of the buyers who participated in the collaboration is unknown at this point. The desynchronized fingerprinting system and method 100 is used to process the illegal movie copy 160 and identify the collaborators.

The illegal movie copy 160 is processed by the desynchronized fingerprinting system and method 100 by trying each of the secret keys 115. If a secret key 115 opens a portion of information embedded within the illegal movie copy 160, then the buyer associated with that key is said to be a collaborator involved in the making of the illegal movie copy 160. In this exemplary implementation shown in FIG. 1, buyers B(6) 165, B(7) 170 and B(9) 175 were identified as being involved in the making of the illegal movie copy 160. Appropriate legal action then can be taken to deter others from collaborating in the making of illegal copies (such as incarcerating the guilty parties 180).

It should be noted that the desynchronized fingerprinting system and method 100 can identify a much greater number of collaborators than the three shown. In fact, one strength of the desynchronized fingerprinting system and method 100 is that it can identify a very large number of collaborators. However, for the sake of simplicity, only three are shown in this exemplary implementation.

III. Operational Overview

Figure 2:
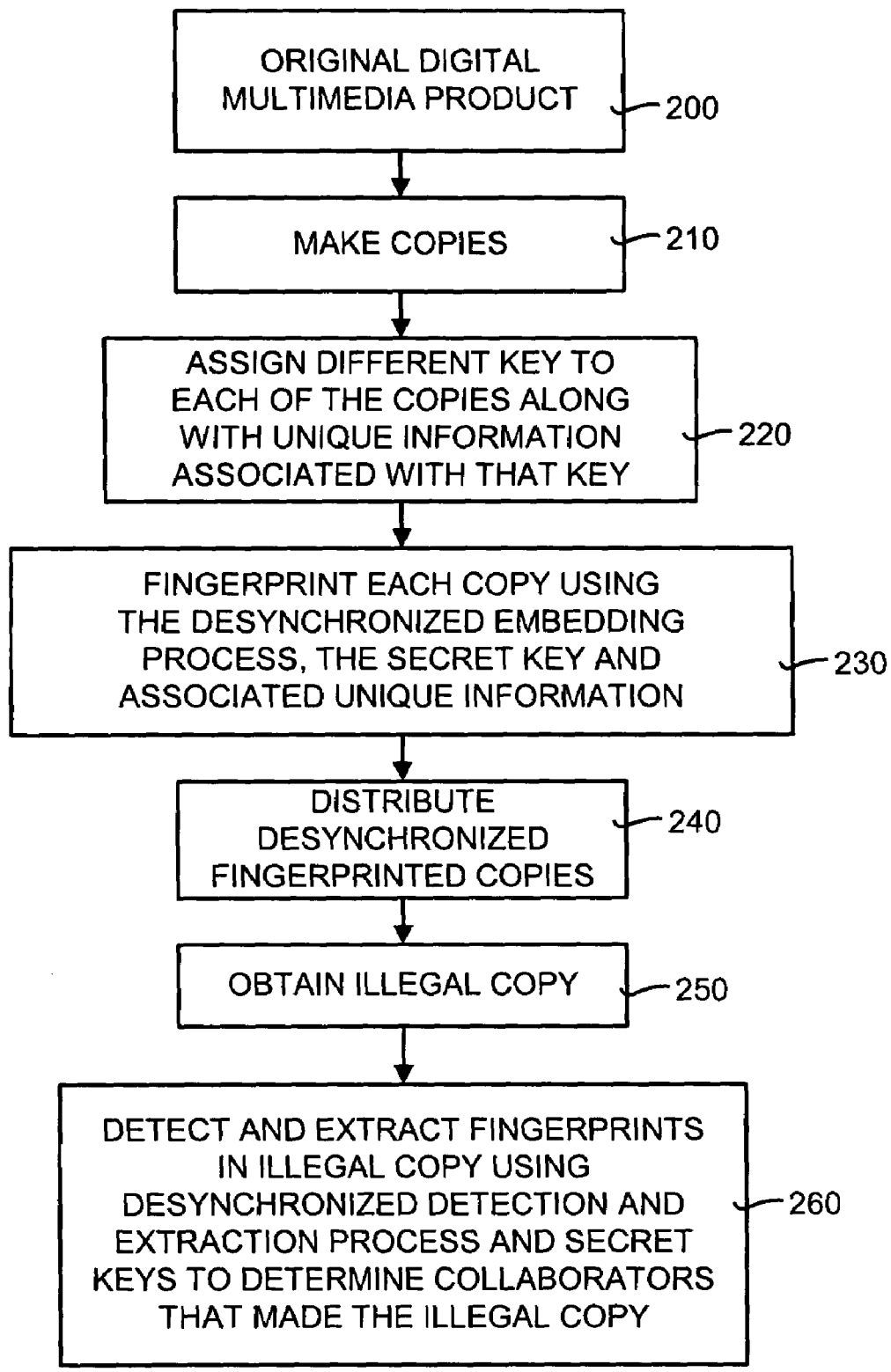
FIG. 2 is a general flow diagram illustrating the general operation of the desynchronized fingerprinting system shown in FIG. 1.

The operation of the desynchronized fingerprinting system and method 100 shown in FIG. 1 now will be discussed. FIG. 2 is a general flow diagram illustrating the general operation of the desynchronized fingerprinting system shown in FIG. 1. The desynchronized fingerprinting method begins by obtaining an original digital multimedia product (box 200) and making copies (box 210). A different and unique secret key is assigned for each copy along with unique information associated with that key (box 220). For example, the unique information may be a number of the copy.

Each copy then is fingerprinted by embedding the secret key and the associated unique information by using a desynchronized embedding process (box 230). The resulting desynchronized fingerprinted copies then are distributed (box 240). For example, the copies may be sold to the general public or available for rental.

Some of the holders of the copies may later collaborate to produce an illegal copy. For example, a small portion of each of the collaborators' copies may be used to produce a single illegal copy. This typically would involve a large number of collaborators. In general, the idea is that the larger number of collaborators the less likely that each of them will be identified as a collaborator.

The illegal copy is obtained (box 250) and is processed by the desynchronized fingerprinting method. The method detects and extracts the embedded fingerprints in the illegal copy (box 260). The embedded fingerprints are detected and extracted using a desynchronized fingerprinting detection and extraction process and secret keys. The desynchronized fingerprinting detection and extraction process determines and identifies the collaborators that participated in the making of the illegal copy.

IV. Operational Details

Figure 3:
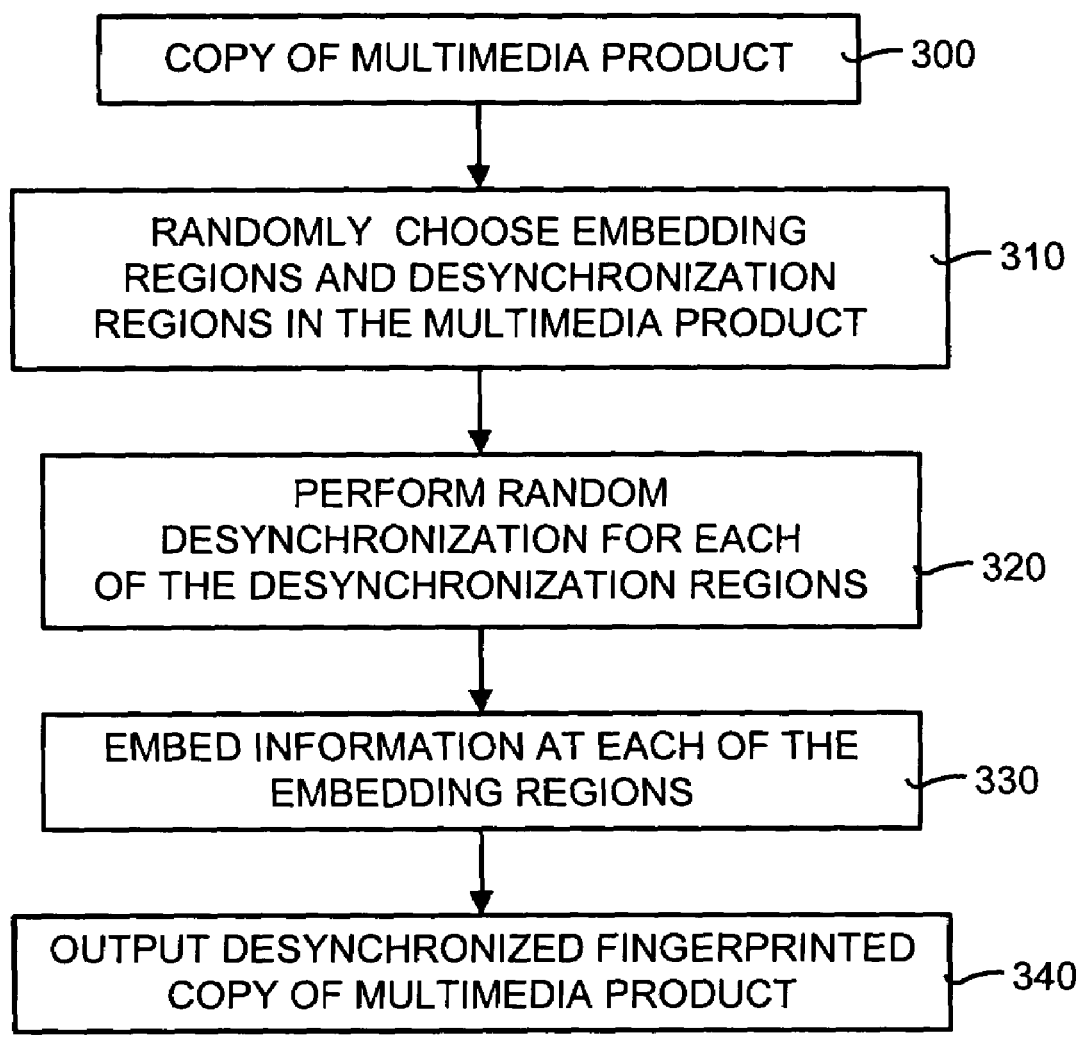
FIG. 3 is a general flow diagram illustrating the operation of the desynchronized embedding process of the desynchronized fingerprinting method shown in FIG. 2.

FIG. 3 is a general flow diagram illustrating the operation of the desynchronized embedding process of the desynchronized fingerprinting method shown in FIG. 2. In general, the desynchronized embedding process performs two functions. First, the process embeds unique information into a copy of a multimedia product at random embedding locations. Second, the process desynchronizes different copies from each other randomly (using the master key) at different desynchronization locations. In one embodiment, the embedding regions and the desynchronization regions are at the same locations. Alternatively, the embedding regions may be at the same locations as the desynchronization regions.

Referring to FIG. 3, the desynchronized embedding process first obtains a copy of the multimedia product (box 300). Next, embedding regions and desynchronization regions of the multimedia product copy are selected randomly (box 310). An embedding region is a location in the multimedia product copy where the fingerprint is to be embedded. A desynchronization region is a location where random width changes are applied. These random width changes are different for each user with high probability. If the multimedia product is a movie, preferably, the embedding region is not a single frame or scene. Alternatively, the embedding region can be a single scene containing a number of frames. If the multimedia product is an audio recording, the embedding region can be audio clip or audio fragment containing a portion of the audio recording. Similar arguments also apply to the desynchronization regions. Typically, the audio clip, where a fingerprint is to be embedded, is much shorter than the entire recording.

The number of embedding and desynchronization regions may be selected randomly or may be selected by a user. Furthermore, the perceptual characteristics of the media content are also significant in this choice. Typically, it is not desirable to embed marks in a region where there is low activity (or regions having little entropy) because of perceptual and security reasons. Naturally, this affects the choice of the number of selected regions. Even if there are a large number of high-activity regions (suitable for mark embedding in terms of security and robustness), the selection of the number of embedding regions is a tradeoff between confidence and expense. A greater number of embedding regions means a larger number of fingerprints and a higher confidence, but a greater expense. On the other hand, a smaller number of embedding regions means a smaller number of fingerprints and a smaller confidence, and a greater number of collaborators that may be missed. However, it also means less expense in detecting and extracting the fingerprints Random desynchronization is performed for each desynchronization region (box 320). Random desynchronization is a novel feature of the desynchronized fingerprinting method that is used to make the desynchronized fingerprinting method secure from estimation attacks. One problem in fingerprinting is the class of collusion attacks that arise if there are numerous copies of the product and if the same scene is fingerprinted with numerous keys. As an example, an attacker can take all of the frames of the scene and compute an average of all the frames (known as an estimation attack, since the attacker is forming an estimate of the original unmarked content). Alternatively, an attacker can select and paste different portions of the scene from different copies, thereby forming a new copy (known as copy and paste attacks). These types of attacks (assuming they are executed properly) generally will kill all the fingerprints.

To counter these types of attacks (such as estimation attacks, copy and paste attacks, and so forth), the desynchronized fingerprinting method uses random desynchronization to randomly vary the number of frames that a scene contains. Note that, in order to be able to apply a collusion attack, one important prerequisite is that all client copies should be "aligned". After applying pseudo-random desynchronization, the number of frames a scene contains varies between copies of the movie. These numbers are chosen pseudo-randomly for each user and hence they are different for each user with high probability. This technique is applied to randomly-chosen regions, called desynchronization regions. The desynchronization technique, which is unique to the desynchronized fingerprinting method, mitigates the probability of an attacker erasing the fingerprints. Thus, copy 1 of the first scene of the movie may contain 28 frames, while copy 2 may contain 32 frames. This severely limits the ability of a potential attacker to apply collusion attacks. This is because the method makes it difficult to synchronize all of the copies and average them. Moreover, more copies means that it is more difficult to synchronize the copies and put them together to launch an estimation attack.

Next, information is embedded at each of the embedding regions (box 330). In general, desynchronization regions and embedding regions need not be the same, but they can possibly overlap. The embedded information may be, for example, the number of the copy of the multimedia product. Finally, the desynchronized fingerprinted copy of the multimedia product is output (box 340).

Figure 4:
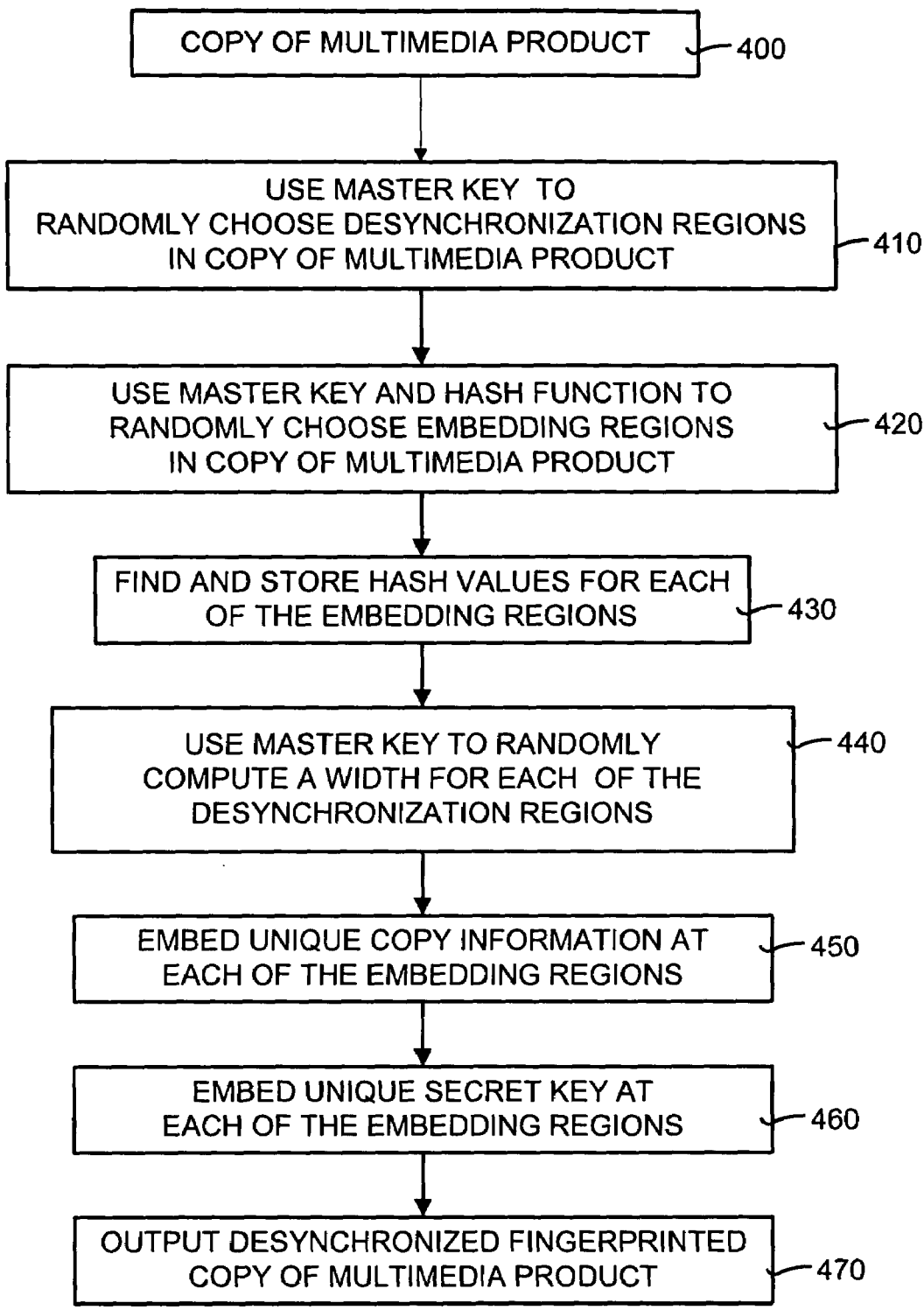
FIG. 4 is a detailed flow diagram illustrating in further detail the operation of the desynchronized embedding process shown in FIG. 3.

FIG. 4 is a detailed flow diagram illustrating in further detail the operation of the desynchronized embedding process shown in FIG. 3. A copy of the multimedia product is created (box 400). Next, a master key is used to randomly select the desynchronization regions within the multimedia product copy (box 410). Also, the master key and a hash function are used to randomly select the embedding regions (box 420). Hash values then are found and stored for each of the embedding regions (box 430).

The random desynchronization process includes randomly varying the width of the desynchronization regions so as to desynchronize product copies. This random desynchronization process includes using the master key to randomly compute a new width for each of the desynchronization regions and changing the width accordingly (box 440). Unique copy information is embedded at each of the embedding regions (box 450). In addition, a secret and unique key is embedded at each of the embedding regions (box 460). Finally, the desynchronized fingerprinted product copy is output (box 470).

Figure 5:
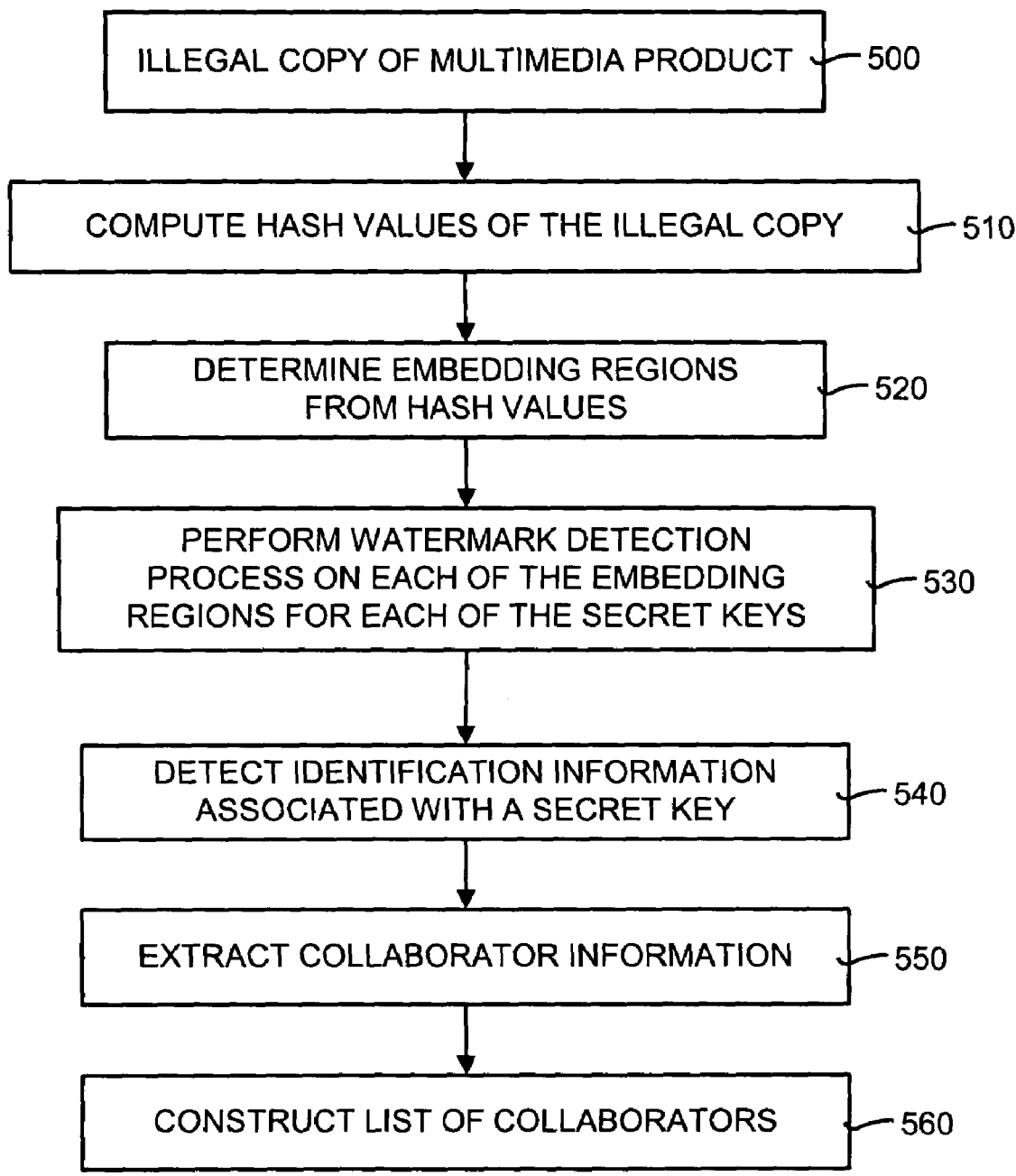
FIG. 5 is a general flow diagram illustrating the operation of the detection and extraction process of the desynchronized fingerprinting method shown in FIG. 2.

FIG. 5 is a general flow diagram illustrating the operation of the detection and extraction process of the desynchronized fingerprinting method shown in FIG. 2. The process begins by obtaining an illegal copy of the original multimedia product (box 500). Next, hash values of the illegal copy are computed (box 510). The embedding regions then are determined from the computed hash values (box 520).

A watermark detection process then is performed on each of the embedding regions for each of the secret keys (box 530). Thus, for each of the embedding regions each of the secret keys is tried. This alleviates the need for fingerprinting codes or other types of codes. At the expense of computation, much larger collusions than are currently available can be traced using this process. Alternatively, a random number of keys may be selected to be tried to the illegal copy. This lessens the computation expense but runs the risk that certain collaborators may be missed.

Identification information associated with a particular secret key then is detected (box 540). This identification may be, for example, the name and address of a buyer of the product copy. Once the identification information is detected, it is extracted and associated with a collaborator to obtain collaborator information (box 550). A list of collaborators then can be constructed (box 560).

V. Exemplary Operating Environment

The desynchronized fingerprinting system and method 100 are designed to operate in a computing environment and on a computing device. The computing environment in which the desynchronized fingerprinting system and method 100 operates will now be discussed. The following discussion is intended to provide a brief, general description of a suitable computing environment in which the desynchronized fingerprinting system and method 100 may be implemented.

Figure 6:
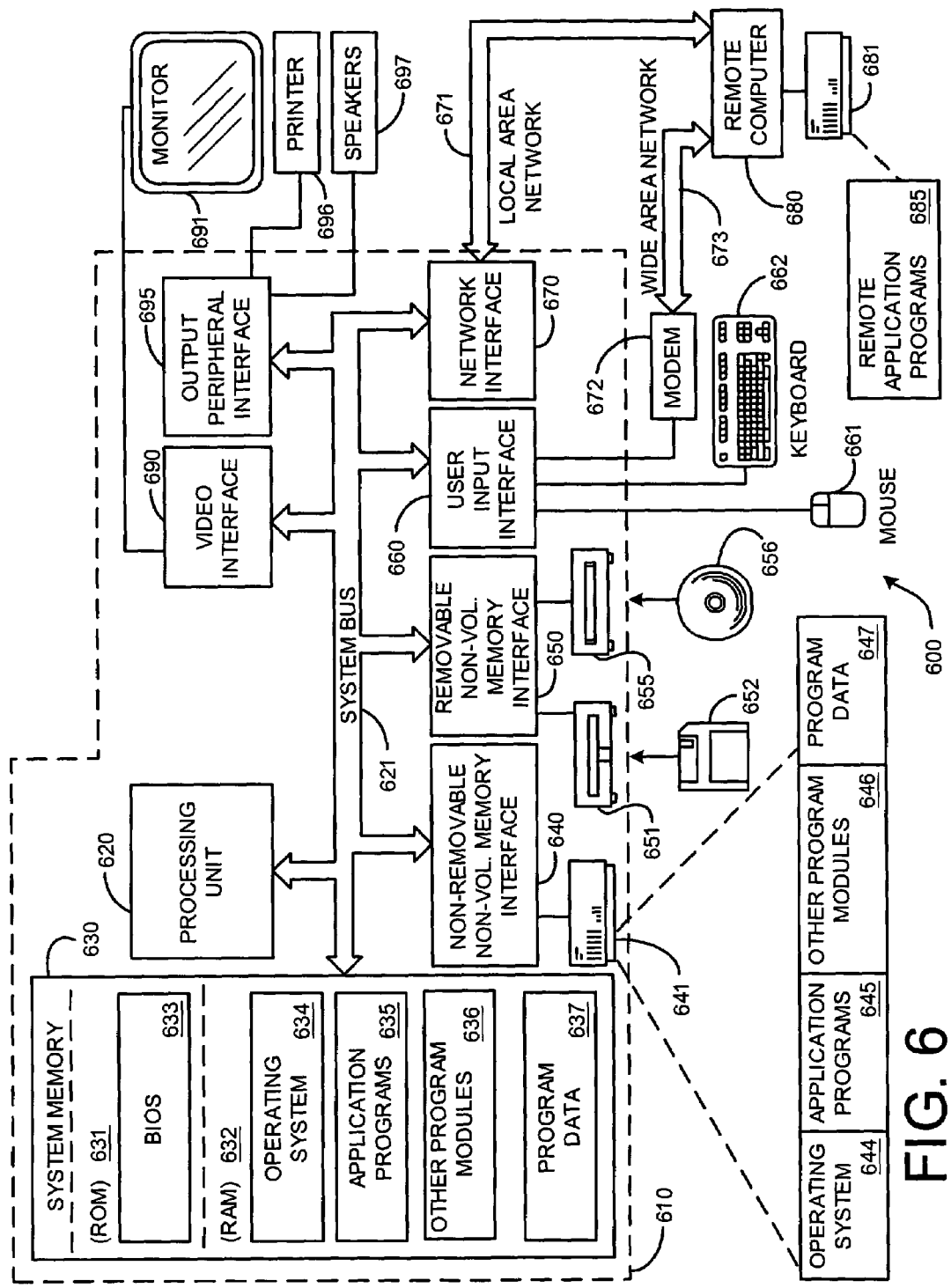
FIG. 6 illustrates an example of a suitable computing system environment in which the desynchronized fingerprinting system and method shown in FIG. 1 may be implemented.

FIG. 6 illustrates an example of a suitable computing system environment in which the desynchronized fingerprinting system and method 100 shown in FIG. 1 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The desynchronized fingerprinting system and method 100 is operational with numerous other general purpose or special purpose computing system environments or configurations. Examples of well known computing systems, environments, and/or configurations that may be suitable for use with the background color estimation system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The desynchronized fingerprinting system and method 100 may be described in the general context of computer-executable instructions, such as program modules, being executed by a computer. Generally, program modules include routines, programs, objects, components, data structures, etc., that perform particular tasks or implement particular abstract data types. The desynchronized fingerprinting system and method 100 may also be practiced in distributed computing environments where tasks are performed by remote processing devices that are linked through a communications network. In a distributed computing environment, program modules may be located in both local and remote computer storage media including memory storage devices. With reference to FIG. 6, an exemplary system for implementing the desynchronized fingerprinting system and method 100 includes a general-purpose computing device in the form of a computer 610.

Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer readable media. Computer readable media can be any available media that can be accessed by the computer 610 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 610. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within the computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 620 through a user input interface 660 that is coupled to the system bus 621, but may be connected by other interface and bus structures, such as, for example, a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

VI. System Components

The desynchronized fingerprinting system 100 shown in FIG. 1 includes a number of program modules that allow the system 100 to uniquely mark copies of a multimedia product and later identify collaborators involved in the production of an illegal copy of the product. In general, the system 100 includes an embedding feature and a detection and extraction feature. The program modules for each of these features now will be discussed.

Figure 7:
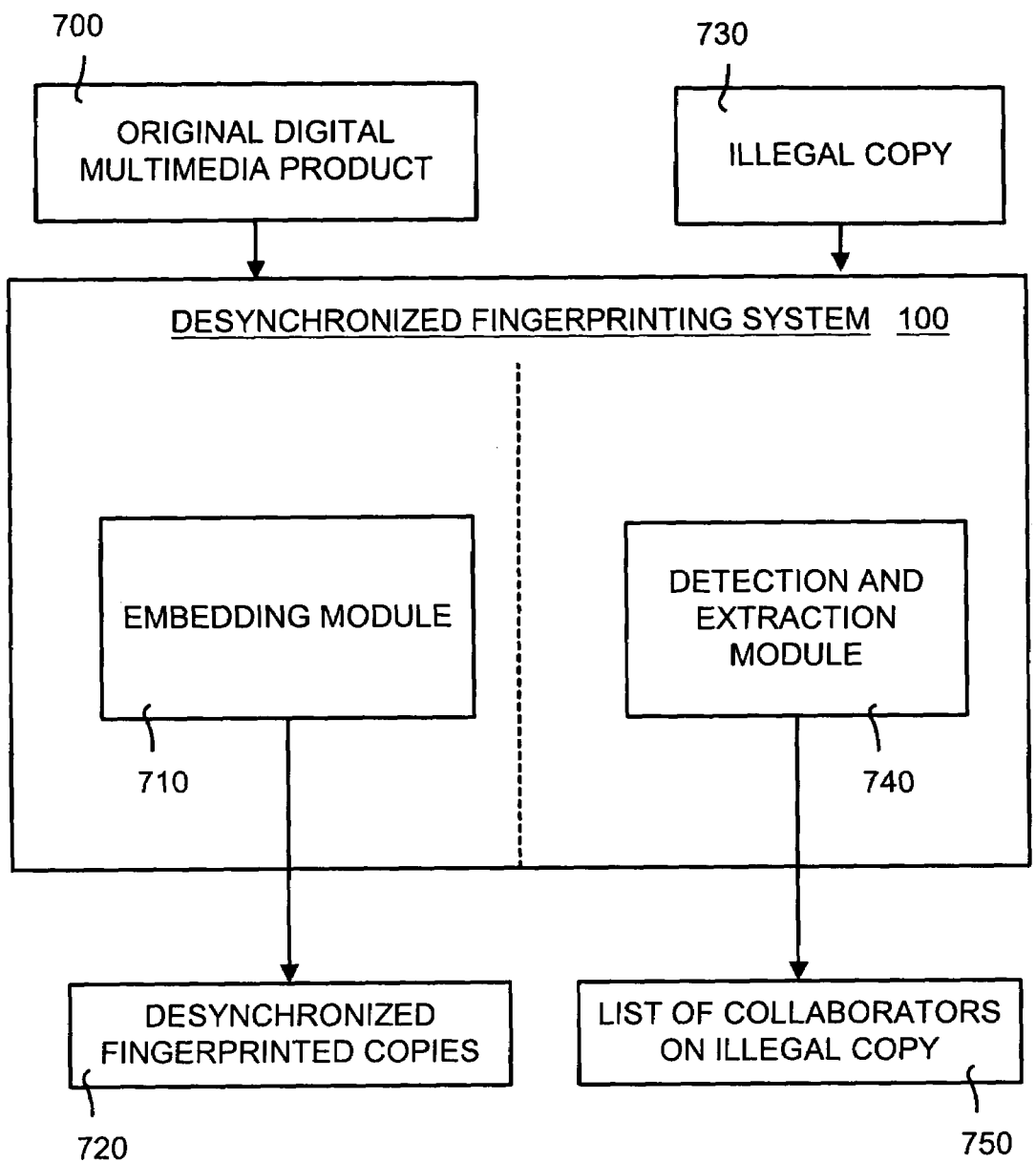
FIG. 7 is a block diagram illustrating the details of the desynchronized fingerprinting system shown in FIG. 1.

FIG. 7 is a block diagram illustrating the details of the desynchronized fingerprinting system 100 shown in FIG. 1. The system 100 essentially has two functions, as illustrated by the dashed line: (a) a desynchronized embedding of fingerprints; and (b) detection and extraction of fingerprints. In particular, for the embedding function, an original digital multimedia product 700 (such as a movie or audio recording) is input into the desynchronized fingerprinting system 100. An embedding module 710, which is located in the desynchronized fingerprinting system 100, is used to process the product 100 such that desynchronized fingerprinted copies 720 of the product 700 are created.

For the detection and extraction function, an illegal copy 730 of the product 700 is obtained and analyzed by the desynchronized fingerprinting system 100. A detection and extraction module 740, which is located in the desynchronized fingerprinting system 100, is used to detect embedded fingerprints and extract information in the fingerprints. This information allows collaborators that had involvement in the production of the illegal copy 730 to be uniquely identified. The desynchronized fingerprinting system 100 then can create a list of collaborators 750.

Figure 8:
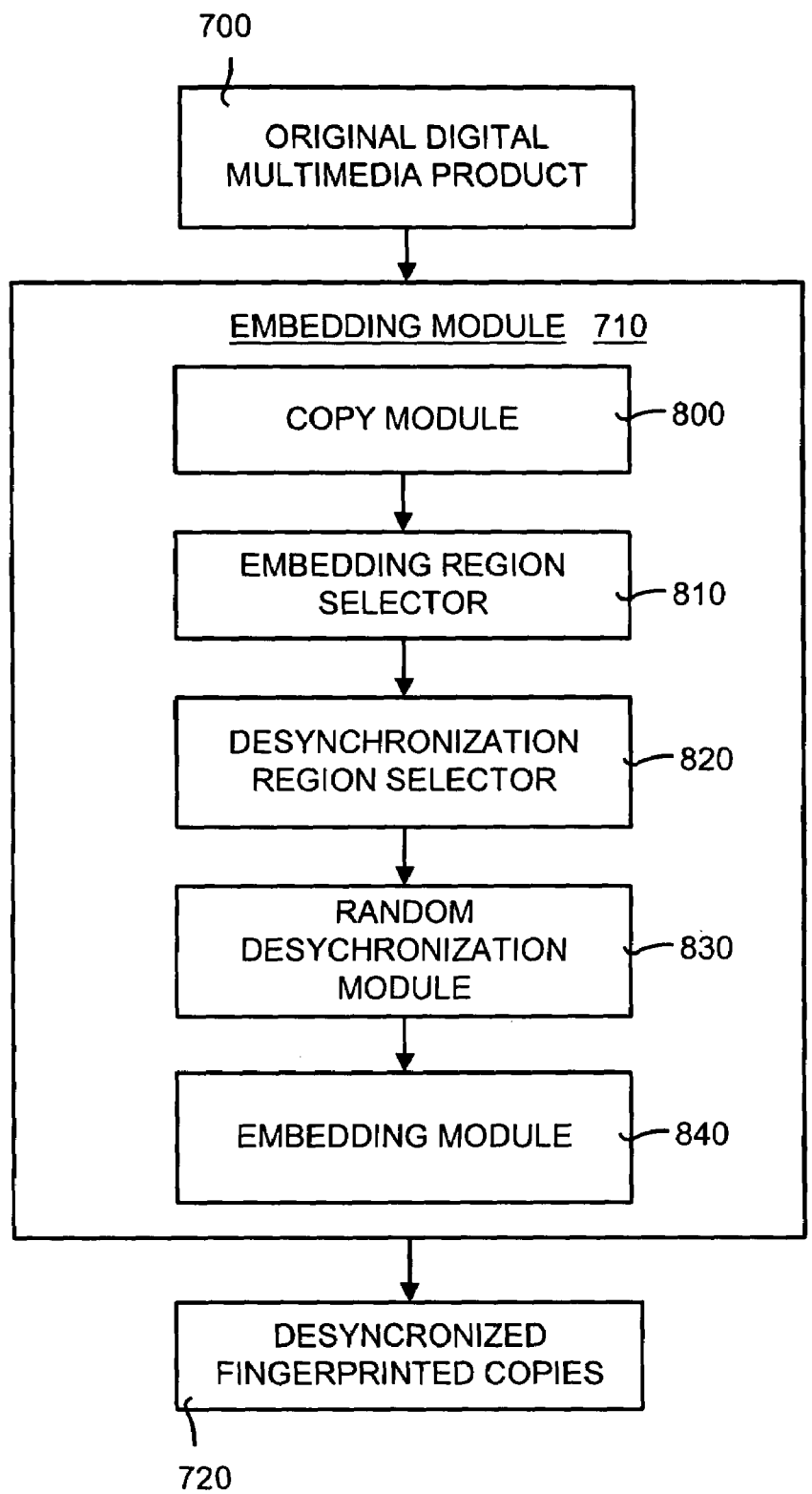
FIG. 8 is a block diagram illustrating the details of the embedding module shown in FIG. 7.

FIG. 8 is a block diagram illustrating the details of the embedding module 710 shown in FIG. 7. In particular, the embedding module 710 includes a copy module 800, an embedding region 810, a desynchronization region selector 820, a random desynchronization module 830, and an embedding module 840. The copy module 800 is used to produce multiple copies of the original digital multimedia product 700. Each of these copies is processed by the embedding module 840. The embedding region selector 810 randomly selects the regions within each copy where the fingerprint embedding will occur. Similarly, the desynchronization region selector 820 randomly selects the regions within each copy to which random desynchronization using width changing will be applied. In some embodiments, the embedding region selector 810 and the desynchronization region selector 820 also select the number of embedding and desynchronization regions.

The random desynchronization module 830 randomly selects a width of each of the desynchronization regions. This means that the width of desynchronization regions will be slightly different between different copies of the product 700. By width, it is meant the number of frames (if the product 700 is a movie) or the time length of an audio segment (if the product 700 is an audio recording). The embedding module 840 embeds fingerprints within each of the embedding regions to produce a desynchronized fingerprinted copy 720 of the product 700.

Figure 9:
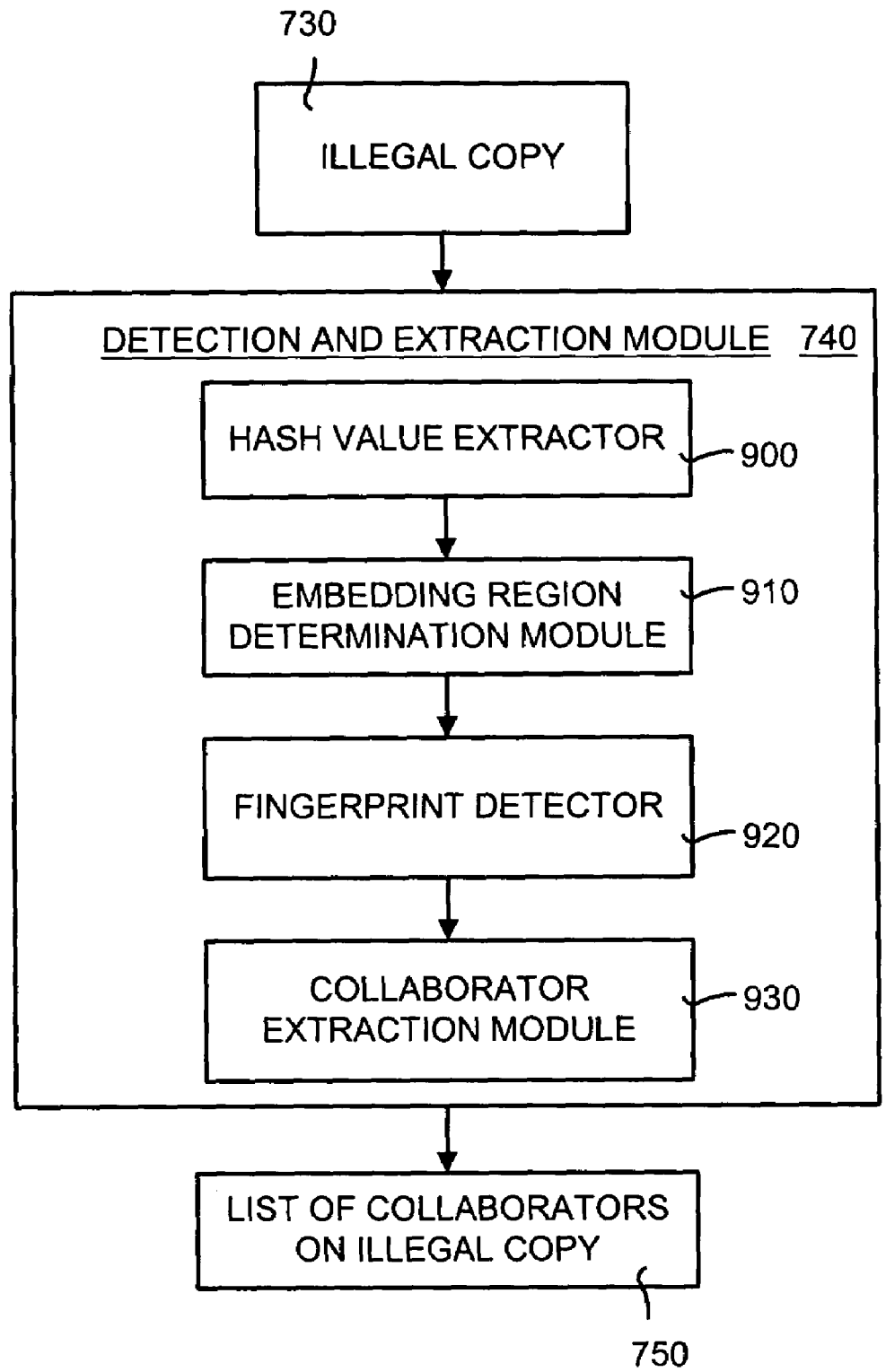
FIG. 9 is a block diagram illustrating the details of the detection and extraction module shown in FIG. 7.

FIG. 9 is a block diagram illustrating the details of the detection and extraction module 740 shown in FIG. 7. The detection and extraction module 740 includes a hash value extractor 900, an embedding region determination module 910, a fingerprint detector 920, and a collaborator extraction module 930. The hash value extractor 900 analyzes the illegal copy 730 and extracts hash values. The embedding region determination module 910 uses the extracted hash values and compares them to the hash values of the embedding regions of the original signal to determine the location of the embedding regions within the copy 730. The fingerprint detector 920 searches for fingerprints in each of the embedding regions. Each of the secret keys is used to detect a fingerprint. The collaborator extraction module 930 extract information about a collaborator based on the secret key used to detect a fingerprint. If a fingerprint is detected using a certain secret key, the unique information associated with that key is used to identify a collaborator that was involved in the production of the illegal copy 730. Because there is typically a large number of collaborators, the list of collaborators is generated that participated in the making of the illegal copy 750.

VII. Working Example

In order to more fully understand the desynchronized fingerprinting system and method disclosed herein, the operational details of an exemplary working example are presented. It should be noted that this working example is only one way in which the desynchronized fingerprinting system and method may be implemented. In this working example, the desynchronized fingerprinting system and method is applied to streaming multimedia objects.

The desynchronized fingerprinting system and method can be used for both audio and video applications. In general, a different key is assigned to each user. The embedding feature includes applying a pseudo-random transformation to chosen regions. The key for the pseudo-random transform is user-specific. These regions are chosen via a secure multimedia hash function. The detection and extraction feature includes a brute-force search in the key space of the users. If one of the keys is "likely" enough, it is declared that the user has been involved in the production of an illegal copy.

Notation

Let the given multimedia signal consist of separate "objects" $s_1, s_2, \ldots, s_M$, where M is the total number of objects. For instance, in a video application, a frame can be treated as an object and M may denote the total number of frames in the video. Alternatively, in an audio application, a fixed-length time-block can be treated as an object and M may denote the total number of such time-blocks. Let N be the total number of customers (or buyers). Accordingly, it is desired to produce N different copies of the multimedia signal. Let $K_i$ be the secret key for user i, $1 \leq i \leq N$. Let K be the secret master key, which is different from $\{K_i\}_{i=1}^{N}$.

Hash Function

Assume that there is a hash function, $$h_K(.)$$

which operates on objects, $$\{s_i\}$$

and its range is $$\{0, 1\}^L.$$

The hash function is a pseudo-random operator, which is randomized by a secret key K.

Let $d(.,.)$ denote the normalized Hamming distance (normalized by L, the length of the output hash value). It is assumed that:

1. $h_K(s_i)$ is approximately uniformly distributed in $\{0, 1\}^L$ for each given i.
2. $Pr[d(h_K(s_i), h_K(s_j)) \geq T_1] \approx 1$, where $s_i$ and $s_j$ are perceptually different objects.
3. $Pr[d(h_K(s_i), h_K(s'_i)) \leq T_0] \approx 1$, where $s_i$ and $s'_i$ are perceptually approximately same objects.

Note that, the probability space is defined over different keys in the criteria above. For most practical purposes, $0 < T_0 < T_1 < 0.5$ and $T_0$ and $T_1$ are sufficiently far apart.

Watermarking of Group of Objects

In this working example, a pseudo-random watermark embedding function was used, $$W_{K_i}(.),$$

which operates on at most R objects. Here $K_i$ is the key for the pseudo-random number generator used in watermarking. Given $1 \leq r \leq R$ objects, say $s_1, \ldots, s_{r-1}, s_r$, the watermark embedding function, produces r objects, $$s_1^{K_i}, \ldots s_{r-1}^{K_i}, s_r^{K_i}$$

as a function of the key $K_i$. The objects, $$\{s_j^{K_i}\}_{j=1}^{r}$$

are perceptually similar to $$\{s_j\}_{j=1}^{r}.$$

Within this context, watermark embedding function can be viewed as a pseudo-random transformation, indexed by a secret key. Furthermore, the working example assume a corresponding watermark detector function $$D_{K_i}(.),$$

which operates on the same number of objects as the embedder function. The domain of the detector function is $\{0,1\}$, where 1 denotes the decision of the presence of the watermark with key $K_i$; and 0 otherwise. It is assumed that the detector function operates reliably, i.e.,

1.

$$Pr[D_{K_i}(\{\hat{s}_j^{K_i}\}_{j=1}^{r}) = 1] \approx 1, \text{ where } \{\hat{s}_j^{K_i}\}_{j=1}^{r}$$

are attacked versions of $$\{s_j^{K_i}\}_{j=1}^{r}$$

such that they are perceptually similar.

2.

$$Pr[D_{K_i}(\{\hat{s}_j^{K_q}\}_{j=1}^{r}) = 0] \approx 1 \text{ for } K_i \neq K_q,$$

and $Pr[D_{K_i}(\{s_j\}_{j=1}^{r}) = 0] \approx 1$.

Mark Embedding of Streaming Multimedia

The mark embedding algorithm for user i ($1 \leq i \leq N$) is given as:

1. Choose P different locations, randomized by the master key K. Let $t_1, t_2, \ldots, t_P$ denote these locations, where, $$t_j \in \{1, 2 \ldots N\}, 1 \leq j \leq P.$$

2. Find and store the hash values, $$\{h_K(s_{t_j})\}_{j=1}^{P}.$$

3. For each location $t_j$, consider a neighborhood around it with width, $$2\Delta_j + 1,$$

thereby find the region $$j, t_j - \Delta_j, t_j - \Delta_j + 1, \ldots, t_j + \Delta_j - 1, t_j + \Delta_j, 1 \leq j \leq P.$$

Here, choose $$\{\Delta_j\}_{j=1}^{P}$$

pseudo-randomly using the master key K such that for all j, $2\Delta_j + 1 \leq R$ and region j does not overlap with region k for all, $j \neq k$.

4. For each $1 \leq j \leq P$, replace $$\{s_k\}_{k=t_j-\Delta_j}^{t_j+\Delta_j} \text{ with } \{s_k^{K_i}\}_{k=t_j-\Delta_j}^{t_j+\Delta_j} = W_{K_i}(\{s_k\}_{k=t_j-\Delta_j}^{t_j+\Delta_j}),$$

where $K_i$ is the secret key for user i.

Decoding of Streaming Multimedia

Let the input to the decoder be the multimedia signal that consists of objects $x_1; x_2; \ldots x_{M'}$. Note that in general it is possible to have, $M' \neq M$.

The detection and extraction (or decoding) process used in the working example includes:
1. For all $1 \leq j \leq M'$, compute the hash values of the received signal $h_K(x_j)$.
2. For each $1 \leq j \leq M'$, perform the following:
  (a) If there exists a $t_k$, $1 \leq k \leq P$, such that $d(h_K(x_j), h_K(s_{t_k})) < T_0$.

then proceed to the next step.
  (b) For all $K_i$, $1 \leq i \leq N$, run a watermark detection algorithm on the width $2\Delta_k + 1$ region around $t_k$: Compute $$d_i = D_{K_i}(\{x_j\}_{j=t_k-\Delta_k}^{t_k+\Delta_k}), 1 \leq i \leq N.$$

(c) For each $1 \leq i \leq N$, if $d_i=1$, declare that user i's mark has been found in the received input.

VIII. An Improved Image-Hash Based Temporal Synchronization Algorithm For Digital Video In the working example of the previous section, a general algorithmic description of the desynchronized fingerprinting system and method was presented. In step 2 of the mark embedding algorithm and step 2(a) of the decoding algorithm of the wording example, a single hash value was employed in order to match mark embedding locations. In practice, however, this is not always enough. In particular, for digital video, the hash value of a single image frame is often not sufficient to find embedding locations accurately enough. Thus, in this section, an improved variant of hash-based region matching technique is presented. This technique uses multiple hash values instead of a single hash value.

In this section, the discussion is confined to digital video and a robust image hash functions is used that is applied to single video frames (single images). However, it should be noted that the methodology can clearly be extended to collection of frames or digital audio signals. Referring to FIG. 9, the improved variant of hash-based region matching technique presented in this section can be applied in the embedding region determination module 910.

The concern is the fact that the mark-embedded video may undergo changes that cause time synchronization problems at detection or decoding. Often, temporal attacks are in this class. In particular, any kind of malicious attack that changes the content order of the video along the time axis (such as scene insertions, changes and swaps, time decimation and interpolation, and shifts) are potentially problematic for decoders. Moreover, even in non-malicious cases, it is possible that the video is cut and pasted or that commercials are inserted in the video for various purposes in the entertainment business. Therefore, a mark-embedded area in the original video might not be at the same temporal location in the received video. In such cases, it is a non-trivial problem to find the mark-embedded locations at the receiver. In order to overcome this problem, the improved variant of hash-based region matching technique presented in this section achieves time synchronization in digital video by using robust image hash functions to determine mark-embedded locations.

This technique assumes that the output of a robust image hash function is invariant under both watermark embedding and also acceptable attacks (in other words, the ones that preserve the perceptual quality). The notation for this section will now be defined for the sake of completeness. It should be noted that the notation in this section is different from the notation in Section VII.

Notation

Bold lowercase letters represent frames, and subscripts represent the indices of elements in a set or vector. Let N be the total number of frames in the original video of interest, and $\{s_1, s_2, \ldots, s_N\}$ and $\{x_1, x_2, \ldots, x_N\}$ denote the original and mark-embedded video frames. Let NN be the total number of frames in the attacked video (which is input to the decoder) and $\{y_1, y_2, \ldots, y_{NN}\}$ denote the attacked video. Note that in general N is not equal to NN. In other words, the length of the attacked video is possibly different from the length of the original and mark-embedded videos. Let M be the total number of embedding regions (i.e., regions where a fingerprint has been embedded). Let h (.) and d (.,.) represent a robust image hash function (that is suitable for use with this hash-based region matching technique and whose specifications are given in Section VII) and the Hamming distance between two binary inputs, respectively. Let td(.,.) denote the temporal distance (with direction information) between any two frames of a given video, e.g., td $(s_m, s_n) = n - m$.

Encoding and Decoding

At the embedder side, for each mark embedding region j (1<=j<=M), K frames are chosen to represent the temporal location of that region. These representative frames are termed as "poles" in the terminology used in this section and denoted by $\{p_{jk}\}$, where j (resp. k) corresponds to the mark-embedding region (with respective to the index of the pole inside that region), 1<=j<=M, 1<=k<=K. Obviously, the set of $\{p_{jk}\}$ is a subset of $\{s_1, s_2, \ldots, s_N\}$. Here, how to choose $\{p_{jk}\}$ given a region j will not be discussed. However, in general, as a rule of thumb, poles should be chosen approximately uniformly distributed inside a mark-embedding region so as to represent that region accurately. Let $\{a_{jk}\}$ be the hash values of $\{p_{jk}\}$, i.e., for all j,k, $a_{jk} = h(P_{jk})$. The hash values $\{a_{jk}\}$ are sent as side information to the receiver. In other words, it is assumed that the receiver (or the decoder) has perfect knowledge of $\{a_{jk}\}$.

The hash values $\{a_{jk}\}$ are used to "lock" the receiver to the correct position in the attacked video $\{y_i\}$ for each mark embedding region j. In order to achieve this task, the following process must be considered, where $\epsilon$ and $\alpha$ are user-dependent parameters:

1. Find $\{b_1, b_2, \ldots, b_{NN}\}$, where $b_i = h(y_i)$, 1<=i<=NN.
2. For each pole $p_{jk}$, form the perceptual similarity sets $F_{jk}$ from $\{y_i\}$, where $F_{jk} = \{y_i | d(b_i, a_{jk}) < \alpha, 1 <= i <= N\}$.

3. For each mark-embedding region j, form the set $G_j$, which consists of all "temporally-suitable" K-tuples from the similarity sets $F_{jk}$: $G_j=\{(g_{j1}, g_{j2}, \ldots, g_{jk})|$ $|td(g_{jk},g_{j,k+1})-td(p_{jk},p_{j,k+1})|<\epsilon, g_{jk}\epsilon F_{jk}, 1<=k<K\}$.
4. Find the optimal K-tuple for embedding region j in the sense of perceptual similarity via hash: $(g_{j1}{}^*, g_{j2}{}^*, \ldots, g_{jK}{}^*)$=argmin $\Sigma_{K=1}{}^K d(h(g_{jk}),a_{jk})$, where the minimization is carried out over all element of $G_j$.
5. The K-tuple $(g_{j1}{}^*, g_{j2}{}^*, \ldots, g_{jK}{}^*)$ determines the j-th embedding location in $\{y_i\}$.

Remark

Note that, by using this straightforward process, steps 3 and 4 take $O(K \Pi_{k=1}{}^K|F_{jk}|)$ operations. The reason is that the total number of possible K-tuples is $\Pi_{k=1}{}^K|F_{jk}|$ (i.e., exponential in K) and for each K-tuple, this approach needs to perform O(K) operations to find its optimal match in the sense of perceptual similarity (in other words, the Hamming distance to the original hash values). However, there is redundancy in these operations because there exist K-tuples that have common elements for which the Hamming distances between the hash values does not need to be recalculated. Thus, a computationally more efficient approach to solve steps 3 and 4 jointly can be applied by using dynamic programming.

Pseudo-Code

The following pseudo-code is presented to illustrate the basic idea by using dynamic programming. This would replace steps 3 and 4 above for any j. Furthermore, let $F_{jk}=\{g_{jkl}\}$, where l indexes the order of each set element.
I. Initialize mindist to a very large number and k=1, l=1.
II. While $1<=l<=F_{jk}$, do
  II.I. Initialize the K-tuple path such that path(m)=0 if m≠k and path(k)=$q_{jkl}$, where path(k) is the k-th entry of path.
  II.II. Initialize dist=d($a_{jk}$,h(path(k))), VALIDITY=GOOD.
  II.III. Apply function FINDOPTPATH(path,dist,k+1,l, VALIDITY) which is defined below.
  II.IV. Increment/by 1, go to step II.I.
function FINDOPTPATH(path,dist,k,l, VALIDITY)
I. Initialize ll=1.
II. While $ll<=|F_{jk}|$ do
  II.I. Compute timedist=|td(path(k-1), $q_{j,k,ll}$)-td($p_{j,k-1}$, $p_{jk}$)|.
  II.II If (k<K) and (timedist>$\epsilon$),
    II.II.I Set VALIDITY=BAD.
    II.II.II. Apply function FINDOPTPATH(path,dist,K,ll, VALIDITY).
  II.III. Else if (k<K) and (timedist<=$\epsilon$),
    II.III.I. Set path(k)=$q_{j,k,ll}$, and increment dist by d($a_{jk}$,h(path(k))).
    II.III.II. Apply function FINDOPTPATH(path,dist,k+1,ll, VALIDITY).
  II.IV. Else if (k=K) and (dist<mindist) and (VALIDITY=GOOD), set mindist=dist and minpath=path.
  II.V. Increment/by 1, go to step II.I.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for desynchronized fingerprinting of digital data, comprising:
    selecting embedding regions in the digital data for embedding fingerprints;
    selecting desynchronization regions in the digital data for desynchronizing copies of the digital data from each other:
    performing random desynchronization for each of the desynchronization regions to randomly vary a width of each of the desynchronization regions; and
    embedding fingerprints at each of the embedding regions to produce desynchronized fingerprinted digital data.

2. The computer-implemented method of claim 1, further comprising randomly selecting the embedding regions and desynchronization regions.

3. The computer-implemented method of claim 1, further comprising using a master key and a hash function to randomly select the embedding regions.

4. The computer-implemented method of claim 3, further comprising finding and storing hash values for each of the embedding regions.

5. The computer-implemented method of claim 1, further comprising using a master key to randomly select the desynchronization regions.

6. The computer-implemented method of claim 1, wherein performing random desynchronization for each of the desynchronization regions further comprises using a master key to randomly compute a width for each of the desynchronization regions such that the width varies between the copies of the digital data.

7. The computer-implemented method of claim 1, further comprising generating multiple copies of the digital data and fingerprinting each copy.

8. The computer-implemented method of claim 1 further comprising embedding a unique secret key at each of the embedding regions.

9. A computer-readable medium having computer-executable instructions for performing the computer-implemented method recited in claim 1.

10. A computer-readable medium having computer-executable instructions for desynchronized fingerprinting of digital multimedia data, comprising:
    generating multiple copies of the digital multimedia data;
    randomly selecting embedding regions within each copy;
    randomly selecting desynchronization regions within each copy;
    computing a random width for each of the desynchronization regions such that a width of each of the desynchronization regions varies between the multiple copies; and
    embedding information at each of the embedding regions to produce desynchronized fingerprinted copies of the digital multimedia data.

11. The computer-readable medium of claim 10, wherein randomly selecting embedding regions further comprises using a pseudo-random operator and a master key.

12. The computer-readable medium of claim 11, wherein the pseudo-random operator is a hash function.

13. The computer-readable medium of claim 10, further comprising finding and storing hash values for each of the embedding regions.

14. The computer-readable medium of claim 10, wherein randomly selecting desynchronization regions further comprises using a master key.

15. The computer-readable medium of claim 10, wherein computing a random width for each of the desynchronization regions further comprises using a master key for computing a random width and changing the width accordingly.

16. The computer-readable medium of claim 10, wherein embedding information at each of the embedding regions further comprises embedding unique copy information and a unique secret key.

17. The computer-readable medium of claim 16, further comprising cataloging the unique copy information such that each of the multiple copies is associated with a specific entity.

18. The computer-readable medium of claim 17, further comprising:
   extracting the unique copy information from an illegal copy of the digital multimedia data; and
   determining from the unique copy information the identities of entities involved in the production of the illegal copy.

19. The computer-readable medium of claim 16, further comprising associating the unique copy information with the unique secret key.

20. The computer-readable medium of claim 19, wherein the unique information is number of a specific one of the multiple copies.

21. A desynchronized fingerprinting system for desynchronized fingerprinting of copies of an original digital multimedia product, comprising:

an embedding module for using a random desynchronization process and a plurality of secret keys to embedding fingerprints in each copy of the product; and a detection and extraction module for detecting the embedded fingerprints using the plurality of secret keys and extracting collaborator information from the fingerprints to identify collaborators in the production of an illegal copy of the digital multimedia product.

22. The desynchronized fingerprinting system as set forth in claim 21, wherein the embedding module further comprises an embedding region selector for randomly selecting embedding regions in each copy of the product in which to embed fingerprints.

23. The desynchronized fingerprinting system as set forth in claim 21, wherein the embedding module further comprises a desynchronization region selector for randomly selecting desynchronization regions in which to apply intentional desynchronization.

24. The desynchronized fingerprinting system as set forth in claim 23, wherein the embedding module further comprises a random desynchronization module for randomly selecting and applying a width of the desynchronization regions such that each width of a desynchronization region is different between each copy of the product.

* * * * *

UNITED STATES PATENT AND TRADEMARK OFFICE
CERTIFICATE OF CORRECTION

PATENT NO. : 7,382,905 B2
APPLICATION NO. : 10/777915
DATED : June 3, 2008
INVENTOR(S) : Ramarathnam Venkatesan et al.

It is certified that error appears in the above-identified patent and that said Letters Patent is hereby corrected as shown below:

In column 18, line 8, in Claim 1, delete "other:" and insert -- other; --, therefor.

In column 18, line 35, in Claim 8, delete "claim 1" and insert -- claim 1, --, therefor.

Signed and Sealed this
Twelfth Day of April, 2011

David J. Kappos
*Director of the United States Patent and Trademark Office*